United States Patent [19]

Abe

[11] Patent Number: 5,710,865
[45] Date of Patent: Jan. 20, 1998

[54] METHOD OF BOUNDARY ESTIMATION FOR VOICE RECOGNITION AND VOICE RECOGNITION DEVICE

[75] Inventor: Yoshiharu Abe, Kamakura, Japan

[73] Assignee: Mitsubishi Denki Kabushiki Kaisha, Tokyo, Japan

[21] Appl. No.: 407,170

[22] Filed: Mar. 21, 1995

[30] Foreign Application Priority Data

Mar. 22, 1994 [JP] Japan ................................. 6-050606

[51] Int. Cl.$^6$ ............................. G10L 5/06; G10L 9/00
[52] U.S. Cl. .................. 395/2.57; 395/2.62; 395/2.65
[58] Field of Search ...................... 395/2.57, 2.65, 395/2.62, 2.64

[56] References Cited

U.S. PATENT DOCUMENTS

| | | | |
|---|---|---|---|
| 4,696,041 | 9/1987 | Sakata | 395/2.62 |
| 4,881,266 | 11/1989 | Nitta et al. | 395/2.57 |
| 5,293,452 | 3/1994 | Picone et al. | 395/2.59 |
| 5,307,444 | 4/1994 | Tsuboka | 395/2.65 |

OTHER PUBLICATIONS

Ljolje et al., "Develpment of an Acoustic Phonetic Hidden Markov Model for Continuous Speech Recognition", IEEE, vol. 39, No. 1, Jan. 1991, pp. 29–39.

Giachin et al., "Word juncture Modeling Using Phonological Rules FOR HMM based continuous speech recognition", IEEE, 90, pp. 737–740.

Eurospeech '93 Conference on Speech Communiction and Technology "A Bounded Transition Hidden Markov Model for Continuous Speech".

"Phonemic Description by State Transition Binding Type HMM" Japanese Acoustic Society, Oct. 1993.

"Phonemic Description by State Transition Binding Type HMM Considering Reliability of Boundry Likelihood" Japanese Acoustic Society, Mar. 1994.

Primary Examiner—Allen R. MacDonald
Assistant Examiner—Patrick N. Edouard
Attorney, Agent, or Firm—Wolf, Greenfield & Sacks, P.C.

[57] ABSTRACT

A method of voice recognition with a boundary binding type in consideration of a kind of a voice boundary estimates a probability where a boundary corresponds to every kind basis of the voice boundary. For a group of parameters within a window of a predetermined time width, the method is to calculate a group of common probability densities independent from the kind of the voice boundary, to multiply the result by first polynomial coefficient and to calculate a first probability where the voice boundary exists in a center of a window, to further multiply the result by a second polynomial coefficient and to calculate a second probability where the voice boundary does not exist in center of a window. A boundary likelihood dependent on a kind of voice boundary is obtained from the first and second probability densities. The voice recognition device compares with a threshold value depending on the kind of phonemic boundary when the time for producing the boundary of the phonemic model series is limited within a region of the phonemic boundary or the neighborhood of the phonemic boundary which is estimated in accordance with a boundary estimating method for the voice corresponding to the kind of phonemic boundary.

23 Claims, 10 Drawing Sheets

| VOICE DATA ||
|---|---|
| LEARNING | 2012 CONTEXTS SELECTED FROM THE ATR PHONEME BALANCE CONTEXTS OF THE CONTINUOUS VOICE DATA BASE OF JAPANESE ACOUSTIC SOCIETY (20 MEN AND 20 WOMEN ARE SELECTED AND EACH SPEAKER IS ALLOWED TO SPEAK EITHER SET OF a"" to "j") |
| EVALUATION | FIRST TEN CONTEXTS (570 PHONEMES) OF THE ATR PHONEME BALANCE CONTEXTS WHICH WHOEN (FKN) HAVE SPOKEN. |
| VOICE ANALYSIS ||
| AD CONVERSION | 10 kHz |
| HIGH FREQUENCY BAND BOOST | $1-z^{-1}$ |
| ANALYSIS WINDOW | HAMMING (LENGTH 25.6 ms) |
| ANALYSIS TIME PERIOD | 10 ms |
| FEATURE EXTRACTION | 15 ORDER LPC MEL-CEPSTRUM ANALYSIS |
| PHONEME MODEL ||
| PHONEME SYSTEM | 29 PHONEME SYSTEM AND 217 PHONEME SYSTEM |
| NUMBER OF STATUSES | ONE STATUS / ONE PHONEME |
| FEATURE AMOUNT | MEL-CEPSTRUM (1 TO 10 ORDER) AND ΔMEL-CEPSTRUM (0 TO 10 ORDER) |
| PROBABILITY DISTRIBUTION | SEMI-CONTINUOUS DISTRIBUTION (232 ELEMENT DISTRIBUTION) |
| ELEMENT DISTRIBUTION | 21 DIMENSIONAL CO-VARIANCE GAUSS DISTRIBUTION |
| BOUNDARY MODEL ||
| BOUNDARY AMOUNT | MEL-CEPSTRUM (1 TO 7 ORDER) x 10 FRAME FIXED LENGTH SEGMENTS |
| KIND OF BOUNDARY | 309 (29 PHONEMES), 1071 (217 PHONEMES) |
| PROBABILITY DISTRIBUTION | SEMI-CONTINUOUS DISTRIBUTION (224 ELEMENT DISTRIBUTION) |
| ELEMENT DISTRIBUTION | 80 DIMENSIONAL CO-VARIANCE GAUSS DISTRIBUTION |

Fig. 4

| PHONEME | NUMBER OF SAMPLES | NORMALIZED FREQUENCY |
|---|---|---|
| a | 14225 | 0.1065503 |
| i | 9451 | 0.0707914 |
| u | 7981 | 0.0597805 |
| e | 7468 | 0.0559380 |
| o | 12164 | 0.0911127 |
| y | 1812 | 0.0135725 |
| w | 1660 | 0.0124340 |
| j | 2921 | 0.0218793 |
| cl | 12176 | 0.0912026 |
| p | 550 | 0.0041197 |
| t | 4796 | 0.0359237 |
| k | 5976 | 0.0447624 |
| ch | 1056 | 0.0079098 |
| ts | 1012 | 0.0075802 |
| s | 2780 | 0.0208232 |
| sh | 2372 | 0.0177671 |
| h | 2409 | 0.0180443 |
| f | 44 | 0.0003296 |
| *cl | 8948 | 0.0670237 |
| b | 1484 | 0.0111157 |
| d | 2472 | 0.0185162 |
| g | 2948 | 0.0220816 |
| z | 869 | 0.0065091 |
| dj | 1387 | 0.0103891 |
| m | 3308 | 0.0247781 |
| n | 5223 | 0.0391221 |
| r | 4916 | 0.0358226 |
| N | 3604 | 0.0269952 |
| # | 7493 | 0.0561252 |
| TOTAL | 133505 | 1.0000000 |

Fig. 5

| PHONEME | NUMBER OF SAMPLES | RELATIVE FREQUENCY | PHONEME | NUMBER OF SAMPLES | RELATIVE FREQUENCY | PHONEME | NUMBER OF SAMPLES | RELATIVE FREQUENCY |
|---|---|---|---|---|---|---|---|---|
| a | 14225 | 0.1065503 | kju | 188 | 0.0014082 | *cIzjo | 292 | 0.0021872 |
| i | 9451 | 0.0707914 | kjo | 188 | 0.0014082 | ba | 424 | 0.0031759 |
| u | 7981 | 0.0597805 | cI | 588 | 0.0051534 | bi | 236 | 0.0017677 |
| e | 7468 | 0.0559360 | cu | 1012 | 0.0075802 | bu | 384 | 0.0028763 |
| o | 12164 | 0.0911127 | cja | 64 | 0.0004794 | be | 168 | 0.0012584 |
| ya | 596 | 0.0044643 | cju | 164 | 0.0012284 | bo | 224 | 0.0016778 |
| yu | 516 | 0.0038650 | cje | 4 | 0.0000300 | bja | 4 | 0.0000300 |
| yo | 700 | 0.0052432 | cjo | 136 | 0.0010187 | bju | 8 | 0.0000599 |
| wa | 1656 | 0.0124040 | sa | 780 | 0.0058425 | bjo | 36 | 0.0002697 |
| wi | 4 | 0.0000300 | sI | 1484 | 0.0111157 | da | 732 | 0.0054829 |
| ja | 487 | 0.0034980 | su | 896 | 0.0067114 | di | 8 | 0.0000599 |
| ju | 1064 | 0.0079897 | se | 588 | 0.0044043 | de | 1176 | 0.0088087 |
| je | 8 | 0.0000599 | so | 516 | 0.0038650 | do | 552 | 0.0041347 |
| jo | 1382 | 0.0103517 | sja | 216 | 0.0016179 | dju | 4 | 0.0000300 |
| cIpa | 115 | 0.0008614 | sju | 304 | 0.0022771 | ga | 1424 | 0.0106663 |
| cIpi | 68 | 0.0005093 | sjo | 368 | 0.0027565 | gI | 296 | 0.0022171 |
| cIpu | 87 | 0.0006517 | ha | 644 | 0.0048238 | gu | 280 | 0.0020973 |
| cIpe | 40 | 0.0002996 | hi | 584 | 0.0043744 | ge | 412 | 0.0030860 |
| cIpo | 150 | 0.0011236 | hu | 567 | 0.0042470 | go | 404 | 0.0030261 |
| cIpja | 8 | 0.0000599 | he | 148 | 0.0011086 | gja | 32 | 0.0002397 |
| cIpjo | 16 | 0.0001198 | ho | 354 | 0.0026516 | gju | 8 | 0.0000599 |
| cIta | 1648 | 0.0123441 | hja | 12 | 0.0000899 | gjo | 92 | 0.0005891 |
| cIti | 23 | 0.0001723 | hju | 4 | 0.0000300 | za | 180 | 0.0013483 |
| cIte | 1397 | 0.0104640 | hjo | 96 | 0.0007191 | zi | 780 | 0.0058425 |
| cIto | 1492 | 0.0111756 | hwa | 12 | 0.0000899 | zu | 432 | 0.0032358 |
| cIka | 1316 | 0.0098573 | hwi | 24 | 0.0001798 | ze | 136 | 0.0010187 |
| cIkI | 897 | 0.0067188 | hwe | 4 | 0.0000300 | zo | 112 | 0.0008385 |
| cIku | 1376 | 0.0103067 | hwo | 4 | 0.0000300 | zja | 64 | 0.0004794 |
| cIke | 576 | 0.0043144 | *cIba | 420 | 0.0031459 | zju | 248 | 0.0018576 |
| cIko | 818 | 0.0061271 | *cIbI | 231 | 0.0017303 | zje | 4 | 0.0000300 |
| cIkja | 37 | 0.0002771 | *cIbu | 380 | 0.0028463 | zjo | 300 | 0.0022471 |
| cIkju | 156 | 0.0011685 | *cIbe | 165 | 0.0012359 | ma | 868 | 0.0065016 |
| cIkjo | 130 | 0.0009737 | *cIbo | 218 | 0.0016329 | mI | 628 | 0.0047039 |
| cIcI | 618 | 0.0046290 | *cIbja | 4 | 0.0000300 | mu | 312 | 0.0023370 |
| cIcu | 957 | 0.0071683 | *cIbju | 8 | 0.0000599 | me | 492 | 0.0036853 |
| cIcja | 40 | 0.0002996 | *cIbjo | 35 | 0.0002622 | mo | 976 | 0.0073106 |
| cIcju | 118 | 0.0008839 | *cIda | 724 | 0.0054230 | mja | 8 | 0.0000599 |
| cIcje | 1 | 0.0000075 | *cIdi | 8 | 0.0000599 | mju | 12 | 0.0000899 |
| cIcjo | 92 | 0.0008891 | *cIde | 1188 | 0.0087487 | mjo | 12 | 0.0000899 |
| pa | 132 | 0.0009887 | *cIdo | 544 | 0.0040748 | na | 1215 | 0.0091008 |
| pi | 80 | 0.0005992 | *cIdju | 4 | 0.0000300 | nI | 1420 | 0.0106363 |
| pu | 104 | 0.0007790 | *cIga | 1384 | 0.0103867 | nu | 124 | 0.0009288 |
| pe | 48 | 0.0003595 | *cIgI | 283 | 0.0021198 | ne | 336 | 0.0025168 |
| po | 158 | 0.0011835 | *cIgu | 265 | 0.0019849 | no | 2016 | 0.0151006 |
| pja | 8 | 0.0000599 | *cIge | 389 | 0.0029137 | nja | 12 | 0.0000899 |
| pju | 4 | 0.0000300 | *cIgo | 389 | 0.0029137 | nju | 95 | 0.0007191 |
| pjo | 16 | 0.0001198 | *cIgja | 30 | 0.0002247 | njo | 4 | 0.0000300 |
| ta | 1768 | 0.0132429 | *cIgju | 7 | 0.0000524 | ra | 300 | 0.0067413 |
| ti | 24 | 0.0001798 | *cIgjo | 87 | 0.0008517 | ri | 808 | 0.0060522 |
| te | 1448 | 0.0108460 | *cIza | 177 | 0.0013258 | ru | 1456 | 0.0109060 |
| to | 1558 | 0.0116550 | *cIzi | 767 | 0.0057451 | re | 1028 | 0.0077001 |
| ka | 1504 | 0.0112655 | *cIzu | 420 | 0.0031459 | ro | 560 | 0.0041946 |
| ki | 980 | 0.0073405 | *cIze | 133 | 0.0009962 | rju | 28 | 0.0002097 |
| ku | 1400 | 0.0104865 | *cIzo | 111 | 0.0008314 | rjo | 136 | 0.0010187 |
| ke | 624 | 0.0046740 | *cIzja | 64 | 0.0004794 | N | 3604 | 0.0269952 |
| ko | 1044 | 0.0078198 | *cIzju | 237 | 0.0017752 | # | 7493 | 0.0561252 |
| kja | 48 | 0.0003595 | *cIzje | 4 | 0.0000300 | TOTAL | 133505 | 1.0000000 |

Fig. 6

| BOUNDARY DE-TECTING SYSTEM CONDITION | | 29 PHONEME SYSTEM | | | | 217 PHONEME SYSTEM | | | |
|---|---|---|---|---|---|---|---|---|---|
| NEIGH-BORHOOD $N(k)$ | THRESH-OLD $\theta_{ij}$ | SUB-STITU-TION | FALL-OUT | IN-SER-TION | TOTAL | SUB-STITU-TION | FALL-OUT | IN-SER-TION | TOTAL |
| NO BINDING | | 18.1 | 0.2 | 139.5 | 157.7 | 29.1 | 0.2 | 137.9 | 167.2 |
| 1 | 0.0 | 18.2 | 1.1 | 45.4 | 64.7 | 28.2 | 0.7 | 43.7 | 72.6 |
| 1 | 1.5 | 17.4 | 1.9 | 26.0 | 45.3 | 24.7 | 1.6 | 22.3 | 48.6 |
| 1 | 2.0 | 17.4 | 2.3 | 21.9 | 41.6 | 24.7 | 1.9 | 19.8 | 46.5 |
| 1 | 2.5 | 16.8 | 3.2 | 14.9 | 34.9 | 23.9 | 3.0 | 14.6 | 41.4 |
| 1 | 3.0 | 19.5 | 3.3 | 11.1 | 33.3 | 26.8 | 3.2 | 13.3 | 43.3 |
| 1 | 3.5 | 20.2 | 4.7 | 7.4 | 32.3 | 29.1 | 3.9 | 9.8 | 42.8 |
| 1 | 4.0 | 18.1 | 7.4 | 4.4 | 29.8 | 24.0 | 7.5 | 4.9 | 36.5 |
| 1 | 5.0 | 16.1 | 13.7 | 2.6 | 32.5 | 16.1 | 13.7 | 2.6 | 32.5 |
| 20 | 0.0 | 20.5 | 0.7 | 49.8 | 71.1 | 26.5 | 0.5 | 45.1 | 72.1 |
| 20 | 1.5 | 18.9 | 2.1 | 26.3 | 47.4 | 24.4 | 1.9 | 24.0 | 50.4 |
| 20 | 2.0 | 18.9 | 2.1 | 18.8 | 39.8 | 25.4 | 2.3 | 20.4 | 48.1 |
| 20 | 2.5 | 16.4 | 2.5 | 15.4 | 36.3 | 24.7 | 3.0 | 14.2 | 41.9 |
| 20 | 3.0 | 18.2 | 3.5 | 12.3 | 34.0 | 25.4 | 3.3 | 9.1 | 37.9 |
| 20 | 3.5 | 18.4 | 5.6 | 9.8 | 33.9 | 26.8 | 4.7 | 7.4 | 38.9 |
| 20 | 4.0 | 19.6 | 6.3 | 7.7 | 33.7 | 26.8 | 5.3 | 5.1 | 38.2 |
| 20 | 5.0 | 21.6 | 22.8 | 1.4 | 45.8 | 23.9 | 19.6 | 1.1 | 44.6 |

Fig. 7

| CLASSIFICATION NUMBER OF PHONEME BOUNDARY | KIND OF PHONEME BOUNDARY | |
|---|---|---|
| | PRECEDING PHONEME | SUCCEEDING PHONEME |
| 1 | a | PHONEME DIFFERENT FROM LEFTMENTIONED |
| 2 | i | " |
| 3 | u | " |
| 4 | e | " |
| 5 | o | " |
| 6 | y, w, j | " |
| 7 | cl | " |
| 8 | p, t, k | " |
| 9 | ch, ts, s, sh, h, f | " |
| 10 | ≠cl | " |
| 11 | b, d, g, z, dj | " |
| 12 | m, n, N | " |
| 13 | r | " |
| 14 | # | " |

Fig. 10  PRIOR ART

METHOD OF BOUNDARY ESTIMATION FOR VOICE RECOGNITION AND VOICE RECOGNITION DEVICE

BACKGROUND OF THE INVENTION

I. Field of the Invention

The invention relates to an improvement for a voice recognition device for recognizing a continuous voice and converting it into a phoneme series.

II. Description of the Related Art

In a system of phonemic description in which a continuous voice is considered as a connection of phonemes, an input voice is analyzed depending on a phonemic model series which is a connection of phoneme models. An optimum phonemic model series for the input voice is obtained by a model calculation means, and the input voice is converted into the phonemic series of the optimum phonemic model series thus obtained. Then, an improvement of an accuracy of recognition can be achieved in such a way that transitions among the phonemic models are limited to a neighborhood of a detected phonemic boundary when applying the phonemic model series through detecting the phonemic boundary directly from the input voice in differently from a calculation of applying the phonemic model series. This conventional phonemic description system is described in detail in "Phonemic Description by State Transition Binding Type HMM" Japanese Acoustic Society, Articles in the Meeting 1-8-5, October in 1993.

In order to perform this conventional phonemic boundary detection with a high accuracy, the phonemic boundary is classified depending on the before and behind phonemes, and based on this classification, a parameter of a probability model is used and learned for each type of phonemic boundary.

FIG. 8 is a structural view of the conventional voice recognition device of this kind. The device uses a HMM calculation section 13 in accordance with the Viterbi algorithm as a model calculation means. The HMM calculation section 13 uses the HMM which assigns one state to one phoneme. In addition, the generating of the boundary of the phonemic model series, appears as a transition between the HMM states.

In addition, for a plurality of phonemic model series prepared by the model calculation means, an optimum state series detection section 15 as a phonemic series conversion means detects an optimum state series to select a phonemic model series.

Operation of each section will be described below.

A voice zone detection section 11 detects a voice zone by power calculation of the input voice, to cut out a voice signal R11 within such a voice zone, and to send it to a feature extraction section 1.

The feature extraction section 1 extracts a feature parameter time series R1 which is formed of a mel-cepstrum coefficient of 0 to 10 orders every 10 ms, by a 15 order linear prediction mel-cepstrum analysis using a time window having a length of 25.6 ms from the voice signal R11 within the voice zone, and sends thus extracted time series to the HMM calculation section 13 and a boundary detection section 7, which act as phoneme model calculation means.

The boundary detection section 7 is formed as shown in FIG. 9, where a region of a voice boundary within the voice, or the neighborhood of the voice boundary is detected, corresponding to the classification of the voice boundary, from the feature parameter time series R1. The classification of the voice boundary is performed in 14 classifications as shown in FIG. 10 with reference to a phoneme name which precedes the voice boundary.

In FIG. 9, for the time t=1, 2, ..., T, from the feature parameter time series R1, the time window 2 extracts a total of 80 (=10 frames×8 dimensions) mel-cepstrum coefficients of 0 to 7 orders within a range of the time width corresponding to 10 frames centered on the time "t", as one vector (hereinafter referred to as a fixed length segment), and outputs the time series R2 of the fixed length segment. (Hereinafter, Bt represents a fixed length segment of a center time "t".)

A boundary detection parameter storage 8 stores a boundary detection parameter R8. The boundary detection parameter R8 is formed of a branch probability λmck, a covariance matrix Σmck, and a mean vector μmck acting as an m-th (m=1, 2, ..., M) element gaussian distribution parameter constituting a distribution of fixed length segments (this is expressed by a mixed Gaussian distribution of M (=4)) of a class "c" (c=0,1) of a classification number "k" (k=1, 2, ..., K) of the K (=14) kinds of phonemic boundary.

Boundary likelihood calculating sections 9002, 9004, ..., 9028 are to refer, corresponding to each category of the phonemic boundary, to probability densities R8001, R8002, ..., R8028, to calculate the likelihood (boundary likelihood) of whether the phonemic boundary of the voice exists in the center of the fixed length segment R2, and to output as boundary likelihood time series C1 (Bt), C2 (Bt), ..., CK (Bt). The boundary likelihood Ck (Bt) of the classification "k" is calculated in accordance with equation (1) as a logarithm likelihood ratio of a probability Pr(Bt/k,1) the probability the phonemic boundary of classification "k" exists in a center of the fixed length segment Bt, and a probability Pr(Bt/k,0), the probability the phonemic boundary of classification "k" does not exist in a center of the fixed length segment Bt. In the foregoing, the probability Pr (Bt | k, 1) is calculated in accordance with the equation (2), and the probability Pr (Bt | k, 0) is calculated in accordance with the equation (3).

In principle, a variance Ck (Bt) is expected to satisfy Ck (Bt)>0 in a region of the phonemic boundary or the neighborhood of the phonemic boundary for each of the classifications "k".

$$Ck(Bt) = \gamma(Bt|k) = \log Pr \frac{(Bt|k,1)}{Pr(Bt|k,0)} \quad (1)$$

$$Pr(Bt|k,1) = \sum_{m=1}^{M} \lambda m1k \, N(Bt|\mu m1k, \Sigma m1k) \quad (2)$$

$$Pr(Bt|k,0) = \frac{1}{2K-1} \left\{ \sum_{k=1}^{K} \sum_{m=1}^{M} \lambda m0k \, N(Bt|\mu m0k, \Sigma m0k) + \sum_{k=1, k \neq k}^{K} \sum_{m=1}^{M} \lambda m1k \, N(Bt|\mu m1k, \Sigma m1k) \right\} \quad (3)$$

FIG. 11 shows a typical structural view of HMM as a phonemic model series. The HMM is of "n" states (n=29), each state of which is allowed to correspond to one phoneme. A probability of transition from a state "i" to a state "j" is shown by aij, and a probability of output in a state "j" of a feature parameter xt at the time "t" is shown by bj(xt). The output probability bj (xt) is represented by a mixed Gaussian distribution of M (=8), and is calculated by equation (4) as a parameter using a branch probability λmj, a covariance matrix Σmj, and a mean vector μmj for an m-th element Gaussian distribution, where in the equations, N(xt |μmj, Σmj ) represents a normal probability density function of mean μmj and covariance Σmj. Those transition probability aij and output probability calculation parameters are stored in an HMM parameter storage section 14.

$$bj(xt) = \sum_{m=1}^{M} \lambda mj \, N(xt|\mu mj, \Sigma mj) \qquad (4)$$

The HMM calculation section 13 refers to a boundary detection result R7 of the boundary detection section 7 and a HMM parameter R14, and calculates, under the condition of the equation (7) expressing an initial condition, the equations (5) and (6) which are recurrence formulae in accordance with the Viterbi algorithm. In equations 5 and 6, α(j, t) represents a probability (a forward probability) remaining on a state "j" at the time t, and β(j, t) represents a back pointer expressing an optimum state number one before, reaching a state "j" at the time t.

$$\alpha(j,t) = \max \{\alpha(i,t-1)aij \, bj(xt)\} \; (t=1,2,\ldots,T) \; 1 \le i \le n, \, \text{Cij(Bt)} > 0 \; (\text{when } i \ne j) \qquad (5)$$

$$\beta(j,t) = \text{argmax} \{\alpha(i,t-1)aij \, bj(xt)\} \; (t=1,2,\ldots,T) \; 1 \le i \le n, \, \text{Cij(Bt)} > 0 \; (\text{when } i \ne j) \qquad (6)$$

$$\alpha(i,0) = 1 \; (i=1,2,\ldots,n) \qquad (7)$$

This HMM, which, as shown in the recurrence formulae, differs from the conventional HMM, refers to a variable Cij(Bt) on a state transition from a state "i" to a state "j" in the time period "t", and a state transition as boundary producing of the phonemic model series is limited so that a state transition is allowed only when Cij (Bt)>0 is satisfied. A transition within the same state (when i=j) is not permitted by the variable.

Here, the variable Cij(Bt) corresponds to a boundary likelihood Ck (Bt) of the phonemic boundary of classification "k" which is calculated by the boundary detecting section 7. The classification "k" is given by a function k(i, j) of the state numbers i and j.

An optimum state series detection section 15 as a phonemic series conversion means outputs an optimum state series R15 (hereinafter referred to as β'(1), β'(2),…, β'(T)) from values of a forward probability α(j, t) and a back pointer β(j, t) which are obtained as a HMM calculation result R13. The optimum state series R15 can be obtained by calculating equation (8) expressing a recurrence formula under the condition of equation (9) expressing an initial condition, where the optimum state series R15 represents the phonemic series of a recognition result expressed by a state number series.

$$\beta'(t-1) = \beta(\beta'(t),t) \; (t=T, T-1, \ldots, 1) \qquad (8)$$

$$\beta'(T) = \text{argmax} \, \alpha(j,T) \qquad (9)$$

$$1 \le j \le n$$

The conventional method of detecting the phonemic boundary is to predetermine a classification of the phonemic boundary, and then depending on such classification of the phonemic boundary, a probability distribution model of the boundary feature amount is formed on the basis of every classification.

Therefore, the same classification is given even in a different phonemic boundary according to the circumstances, and this may provide a possibility not always suitable for the proper phonemic boundary. The conventional method can theoretically also be used for designing a separate boundary detector in response to the individual phonemic boundary through improving the classification of the phonemic boundary. However, it is actually, impossible to design, with a high accuracy, the individual boundary detectors in response to the phonemic boundary which hardly appears because of lack of learning data since it is difficult to collect the learning data in an amount sufficient to allow learning.

Furthermore, in the calculation of the conventional phonemic model series, there is the disadvantage that a difference in distribution of values of likelihood of the phonemic boundary (reliability) which are thought to be different depending on the phonemic boundaries, is not taken into consideration, because when appearance of the phonemic boundary is limited to a region of the phonemic boundary or the neighborhood of the phonemic boundary detected from an input voice, then a constant value irrespective of classification of the phonemic boundary is used as a threshold value for the phonemic boundary likelihood value.

SUMMARY OF THE INVENTION

According to one aspect of the present invention, there is provided a method of estimating a voice recognition boundary which is a parameter Group obtained by analyzing an input voice, and when proceeding to obtain a parameter group developed in time series, to extract as a sample each value of the parameter group within a window of a predetermined time width, and to calculate a degree to which the voice boundary exists at the center of the window, including the steps of, calculating a first probability density where the voice boundary exists at a center of the window and a second probability density where the voice boundary does not exist at a center of the window, and calculating a degree to which the voice boundary exists in the center of the window in accordance with a calculation including the first probability density and the second probability density, a method of estimating a voice recognition boundary characterized by comprising the steps of; calculating a common probability density which is independent from a kind of voice boundary; calculating the first probability density by multiplying the probability density calculated through such calculating means by a first polynomial coefficient; and calculating the second probability density by also multiplying the probability density calculated through such calculating means by a second polynomial coefficient.

According to another aspect of the present invention, there is provided a voice recognition device including, a feature extracting means for analyzing an input voice and converting it into a feature parameter time series; a boundary detecting means for detecting a region of a phonemic boundary or a neighborhood of the phonemic boundary in the input voice from the feature parameter time series; a model calculating means in which a time of producing each boundary of a plurality of phonemic model series is limited within a region of the phonemic boundary or the neighborhood of the phonemic boundary which the boundary detecting means detects when preparing the model series, the phonemic model series being prepared corresponding to the feature parameter; and a phonemic series converting means for selecting a suitable phonemic model series corresponding to the input voice from a result of the model calculating means. wherein a voice recognition device includes a boundary detecting means for detecting a phonemic boundary by comparing with a threshold value having a dependency to a type of phonemic boundary.

In a method of estimating a phonemic recognition boundary according to another aspect of the invention, a value which a parameter Group varying in time series shows within a window of predetermined time width is extracted as a sample, and a common probability density is calculated, which is independent of the kind of voice boundary when calculating a first probability density having a high value, where the thus extracted value is a sample where the boundary exists in the center of the time window, and a second probability density having a high value where the thus extracted value is a sample where the boundary does not exist in the center of the time window, and then multiplying the thus calculated common probability density by a first polynomial coefficient, thus calculating the first probability density, the common probability density being then multiplied by a second polynomial coefficient, thus calculating the second probability density.

The voice recognition device according to the invention is such that, when estimating a region of the phonemic boundary or the neighborhood of the phonemic boundary of input voice, the phonemic boundary is detected by comparison with a threshold depending on the type of phonemic boundary, thereby preparing a phonemic model series in which the time for producing a transition of the phonemic model series corresponding to a feature parameter is limited to the region of the phonemic boundary or the neighborhood of the phonemic boundary, from among which an optimum phonemic model series is selected.

BRIEF DESCRIPTION OF THE DRAWING

FIG. 4 is an illustrative view showing a condition when evaluating the first embodiment;

FIG. 5 is an illustrative view showing a number of samples in learning of the first embodiment;

FIG. 6 is an illustrative view showing a number of samples in learning of the first embodiment;

FIG. 7 is an illustrative view showing a result of evaluation of the embodiment 1;

FIG. 10 is an illustrative view showing classification of a phoneme boundary in the conventional voice recognition device.

DETAILED DESCRIPTION OF THE PREFERRED EMBODIMENT

EMBODIMENT I

Figure 1:
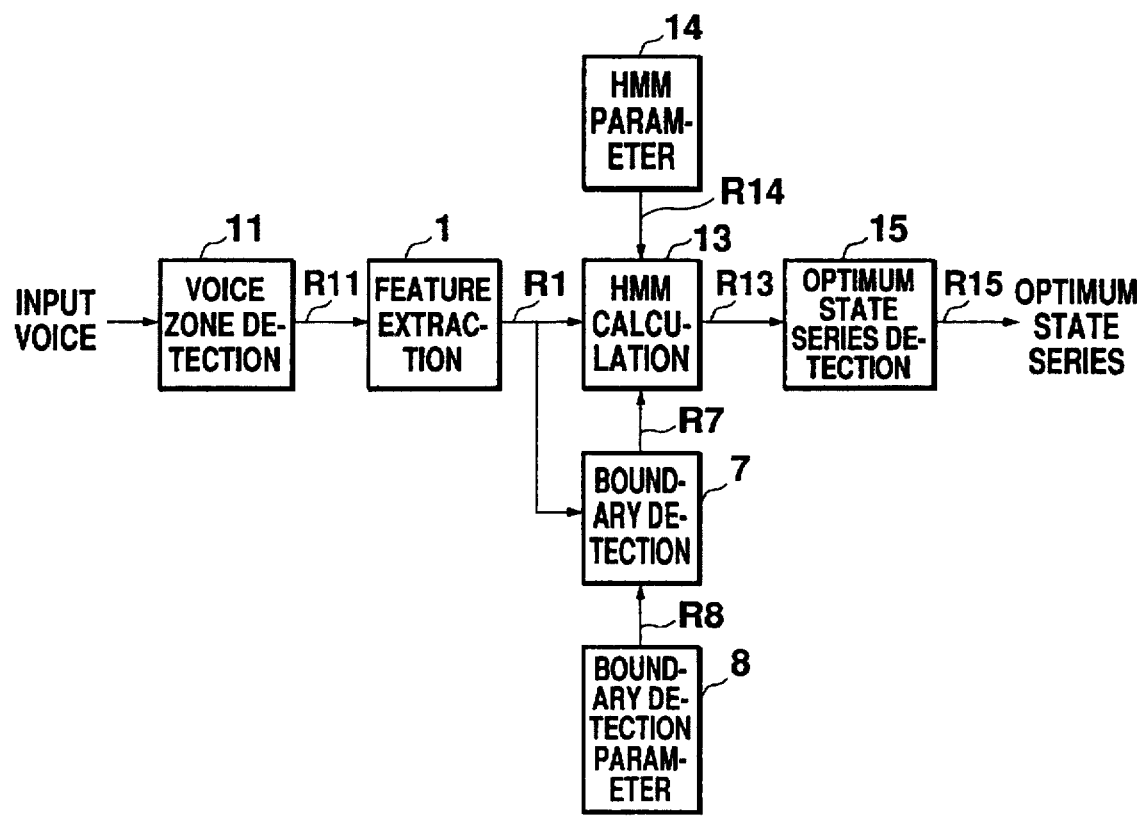
FIG. 1 is a structural view showing a first embodiment according to the invention.

Embodiments according to the present invention will be described.

This embodiment employs, as a phonemic model series, an HMM (hereinafter referred to as "a phonemic series HMM") where the phoneme HMM with one state is assigned to one phoneme. Hence, in this embodiment, the producing of a phonemic boundary within the phonemic model series appears as transition between states of the phonemic series HMM. Even when using the phoneme HMM having plural states per phoneme, it is needless to say that the present application can be applied. In this case, the producing of the phonemic boundary within the phonemic model series appears as a transition between the states (within the phonemic series HMM) corresponding to the transitions between the phonemic models.

In this embodiment, an HMM calculating means is used as a model calculating means in accordance with the Viterbi algorithm where a calculation of addition in the HMM calculation in accordance with an ordinary trellis algorithm is replaced by calculation for maximizing. Of course, the present invention can be applied even in the HMM calculation in accordance with the ordinary trellis algorithm.

A principle of detecting a boundary in the conventional example and this embodiment, is to calculate a first probability density where a boundary feature amount Bt is produced from distribution of the phonemic boundary and a second probability density produced from distribution of the non-phonemic boundary, and if the former is larger than the latter, then it is determined that the phonemic boundary exists.

For the conventional practical utilization of the principle, in each classification of the phonemic environment which is classified into a smaller number of K pieces compared with a combining number of (n×n) for a phonemic kind number of "n", a distribution of a boundary feature amount is expressed by a mixed continuous distribution model, the first and second probability densities are expressed as a linear sum of the probability density of each category, in addition, a ratio of the two in the above is made into a logarithm to produce a boundary likelihood value. In contrast to this, in the present embodiment, a concept of "a semi-continuous distribution model" is introduced into an expression of the first and second probability densities, and the boundary likelihood value is provided as shown in the equation (10).

$$Ck(Bt) = \log \frac{\sum_{m=1}^{M} Pmk\, fm(Bt)}{\sum_{m=1}^{M} Qmk\, fm(Bt)} \tag{10}$$

Where, M represents a number of element distribution (size of code book), fm represents a probability density function of an m-th element distribution, Pmk and Qmk represent a polynomial formula coefficient which is obtained in the learning method as described later. An integer "k" is a serial number given to all kinds of phonemic boundaries which are physically observed, and expresses the kind of the phonemic boundary. Namely, the number of the phonemic boundary corresponding to transition from state "i" to state "j" is given by k=k (i,j) using a unique function k (i, j) of states "i" and "j". The function k is assumed to designate a true phonemic boundary when i≠j, and to designate a non-phonemic boundary (i.e., a center portion of the phonemic zone) when i=j.

According to the method described above, a problem of designing the boundary detector can be separated into two problems. Namely, a problem of designing a probability density function (fm) (that is, designing of the code book) of element distribution independent of the kind "k" of phonemic boundary, and a problem of designing a polynomial coefficient (Pmk and Qmk) of numerator and denominator for every kind "k" of the phonemic boundary. For such designing of polynomial coefficients (Pmk and Qmk) of the numerator and denominator, a boundary likelihood degree may preferably be adapted to become higher for the boundary feature amount (this is expressed by a fixed length segment) of the "k" kind of phonemic boundary, and to become lower for the boundary feature amount of the other kinds of phonemic boundaries.

FIG. 1 is a structural view of one embodiment according to the invention and a basic structure thereof is the same as those in the conventional example. Each part in FIG. 1 will be described A voice zone detection section 11 detects a voice zone from a power calculation of an input voice, and extracts a voice signal R11 within this voice zone to send it to a feature extraction section 1.

The feature extraction section 1 extracts a feature parameter time series R1 formed of mel-cepstrum coefficients from 0 to 10 orders at every 10 ms using a 15 order linear prediction mel-cepstrum analysis using the time window having a length 25.6 ms from among the voice signals R11 within the voice zone, and then sends the thus extracted feature to the HMM calculation section 13 and the boundary detection section 7 as a phonemic model calculating means.

Figure 2:
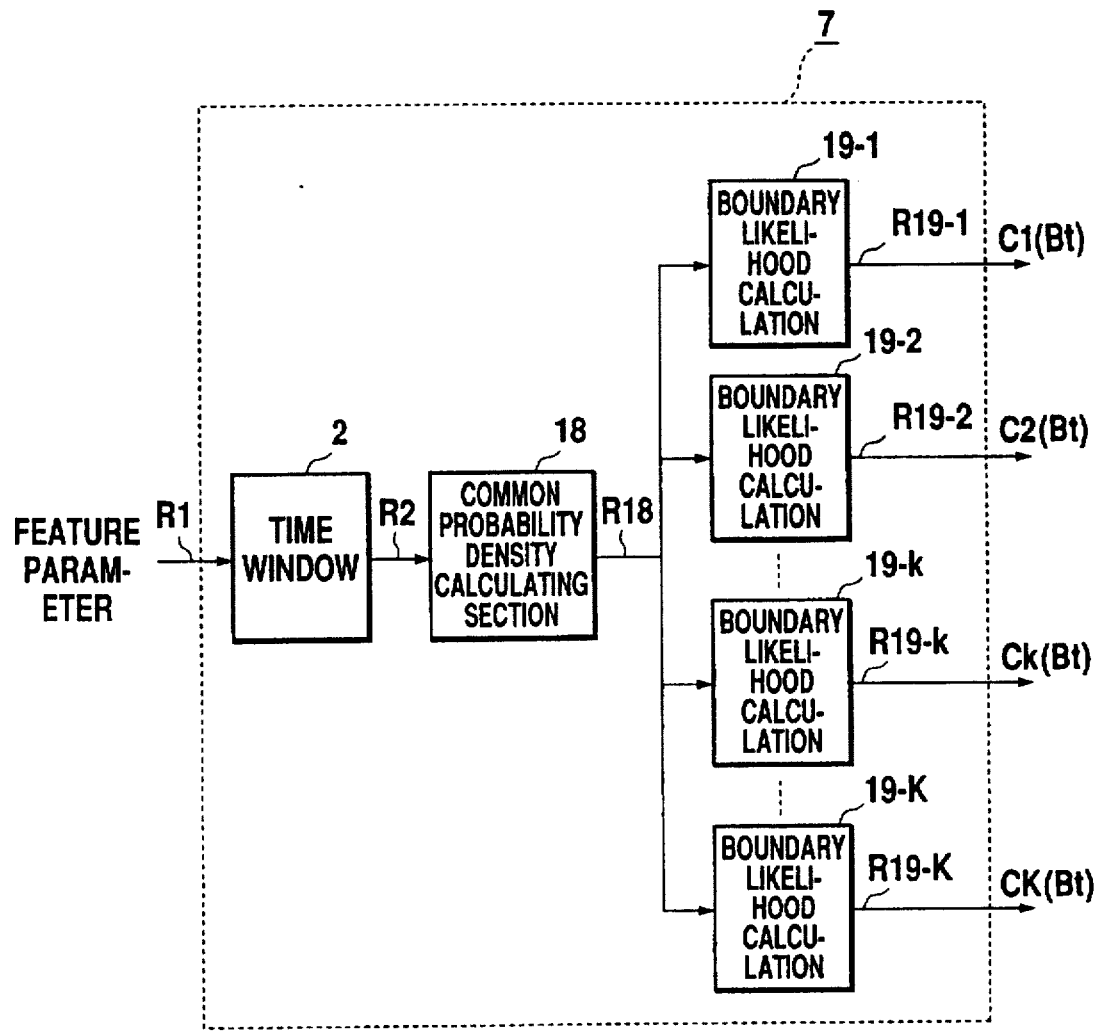
FIG. 2 is a structural view of a boundary detecting means in the first embodiment.

The boundary detection section 7 is formed as shown in FIG. 2. In the drawing, for the time t=1, 2, . . . , T from the feature parameter time series R1, a time window 2 extracts a total of 80 (=10 frames×8 dimensions) mel-cepstrum coefficients from 0 to 7 orders in a range of time width 10 frames centered around the time "t" as one 80 dimensional vector (hereinafter referred to as "a fixed length segment"), and then outputs the time series R2 of these fixed length segments. (Hereinafter, a fixed length segment of the center time "t" is referred to as "Bt".)

A boundary detection parameter storage 8 stores a boundary detecting parameter R8. The boundary detection parameter R8 is formed of, a mean vector μm and covariance matrix Σm of the probability density function of M (=224) 80 dimensional Gaussian distributions, and K (=309 (when 29 phonemic systems) or 1071 (when 217 phonemic systems)) sets of numerator polynomial coefficient Pmk and denominator polynomial coefficients Qmk (Where "m" and "k" are assumed as integers satisfying a range of $1 \leq m \leq M$, $1 \leq k \leq K$).

A common probability density calculating section 18 calculates the probability density of a number M of 80 dimensional Gaussian distributions as to a fixed length segment Bt (t=1, 2, . . . , T), where a m-th probability density (m=1, 2, . . . , M) is assumed as fm (Bt), then this is calculated in accordance with the equation (11).

$$fm(Bt) = N(Bt | \mu m, \Sigma m) \tag{11}$$

Boundary likelihood calculation sections 19-1, 19-2, . . . , 19-K are to correspond to kinds of phonemic boundaries, and refer to a result R18 of the common probability density calculation section to calculate a likelihood (boundary likelihood) of whether a phonemic boundary within voice exists in center of the fixed length segment R2, and to output as a boundary likelihood time series C1 (Bt), C2 (Bt), . . . , CK (Bt). The k-th (k=1, 2, . . . , K) boundary likelihood Ck (Bt) is calculated in accordance with the equation (12) as a logarithm likelihood ratio of a probability Pr (Bt|k, 1) where the phonemic boundary of the kind "k" exists at the center of the fixed length segment Bt versus a probability Pr (Bt|k, 0) where the phonemic boundary of the kind "k" does not exist at the center of the fixed length segment Bt. Here, the probability Pr (Bt|k, 1) is calculated in accordance with the equation (13), and the probability Pr (Bt |k, 0) is calculated in accordance with the equation (14).

It is required that the numerator polynomial coefficient Pmk and denominator polynomial coefficient Qmk are designed so that a variable Ck (Bt) satisfies Ck (Bt)>0 in the region of the phonemic boundary or the neighborhood of the phonemic boundary of the kind "k".

$$Ck(Bt) = \log \frac{Pr(Bt|k,1)}{Pr(Bt|k,0)} \tag{12}$$

$$Pr(Bt|k,1) = \sum_{m=1}^{M} Pmk \, fm(Bt) \tag{13}$$

$$Pr(Bt|k,0) = \sum_{m=1}^{M} Qmk \, fm(Bt) \tag{14}$$

Next, a method of designing the numerator and denominator polynomial coefficients in the present embodiment will be described. The polynomial coefficient is placed under the condition of non-negative type whose total sum for Pmk and Qmk is equal to "1".

First, the code book is designed for obtaining a parameter (in this embodiment, a parameter is formed of μm and Σm) of a probability density function (fm) of elements independent of the kinds "k" of phonemic boundary. This can be realized by estimating parameters of element distribution from distribution of each cluster through clustering the learning data. In this embodiment, the learning data are divided into M (=224) clusters, and a mean vector μm and covariance matrix Σm of each cluster (m=1, 2, . . . , M) are estimated.

As shown in the following, in accordance with a method of estimating a maximum likelihood degree, a polynomial coefficient, which is estimated from data of the kinds "k" of the phonemic boundary, is assumed as λmk. That is, the polynomial coefficient λmk is determined for maximizing a likelihood (the equation (15)).

$$\prod_t \sum_m \lambda mk \, fm(Bt) \tag{15}$$

A design method 1 for numerator polynomial: The polynomial coefficient which has been estimated as a maximum likelihood is used as a numerator polynomial coefficient as it is. In this designing method, Pmk=λmk is conditioned. A design method 2 for numerator polynomial: Taking, from the nearest side, N(k) kinds of phonemic boundary having the most likelihood estimation polynomial coefficient which is similar to the most likelihood estimation polynomial coefficient λmk of the kinds k=k (i, j) of the phonemic boundary, the thus taken is then made, k(1), k(2), . . . , k(N(k)) (where k(1) is "k" itself). These N(k) sets of most likelihood estimation polynomial coefficients are weightedly averaged and the numerator polynomial coefficient Pmk is set in accordance with the equation (16), where "Wk" represents the number of learning data (the number of samples) of the boundary feature amount of the kinds "k" of the phonemic boundary. The most likelihood estimation polynomial coefficient λmk of kinds "k" of the phonemic boundary and the non-similarity degree (referred to as "d(k, 1)") of the most likelihood estimation polynomial coefficient λml of the kinds "1" of the phonemic boundary are estimated in accordance with the equation (17) which expresses a distance between the polynomial coefficients.

With reference to the present designing method, a clustering effect can be expected in accordance with a similarity degree of the phonemic boundary and a smoothing effect compensating a lack of the learning data.

$$Pmk = \frac{\sum_{i=1}^{N(k)} Wk(i) \lambda m\,k(i)}{\sum_{i=1}^{N(k)} Wk(i)} \quad (m = 1, 2, \ldots, M) \tag{16}$$

$$d(k,l) = \frac{1}{2} \log \frac{\sum_{m=1}^{M} \lambda mk\, \lambda mk\, \sum_{m=1}^{M} \lambda ml\, \lambda ml}{\left(\sum_{m=1}^{M} \lambda mk\, \lambda ml\right)^2} \tag{17}$$

A designing method for the denominator polynomial: a procedure for estimating variable Ck(Bt) as larger for boundary data, and as smaller for non-boundary data can be considered (for example, a method of estimating the error correction learning and the maximum estimation method of information amount one another). However in this embodiment, the most likelihood estimation polynomial coefficient of all the kinds (k(i, i), i=1, 2, ..., n, where "n" represents the kind of the phonemes) of the phonemic boundary corresponding to a stationary portion of the phoneme, is weightedly averaged and made a denominator polynomial coefficient. This designates, the denominator polynomial coefficient are set in accordance with the equation (18). In this designing method, the denominator polynomial coefficient Qmk is set independently from the kind "k" (without dependency to K) of the phonemic boundary.

$$Qmk = Qm = \frac{\sum_{i=1}^{n} Wk(i,i)\, \lambda k(i,i)}{\sum_{i=1}^{n} Wk(i, i)} \tag{18}$$

Figure 3:
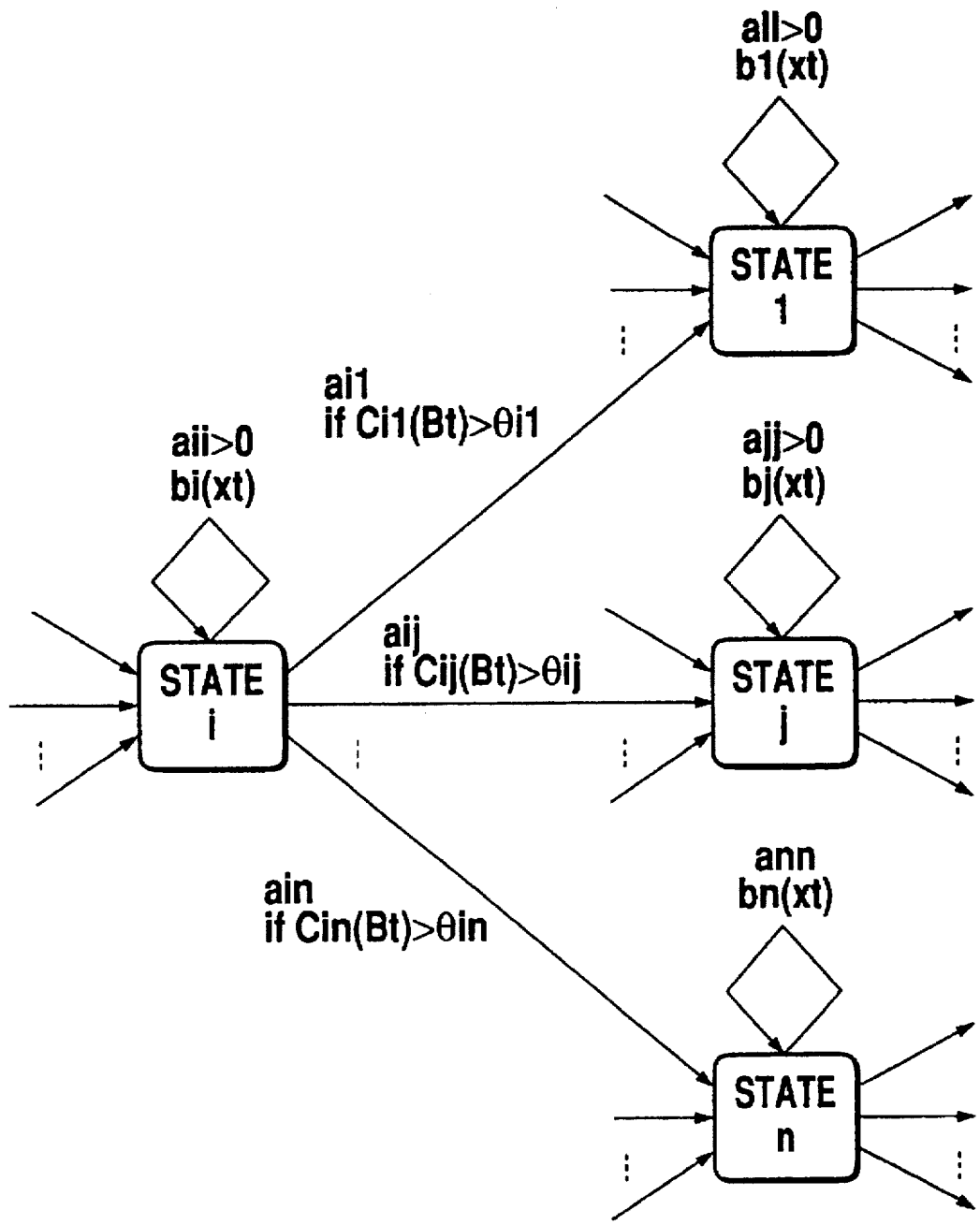
FIG. 3 is a structural view of HMM in the embodiment 1.
Figure 8:
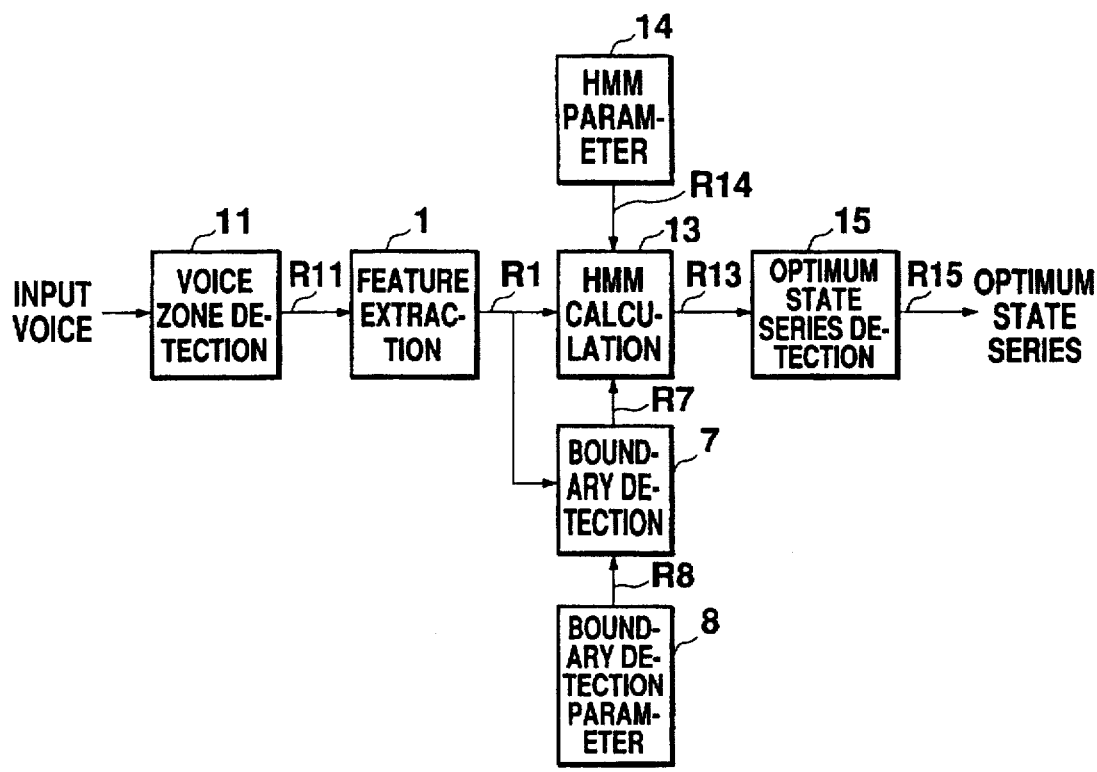
FIG. 8 is a structural view of the conventional voice recognition device.
Figure 9:
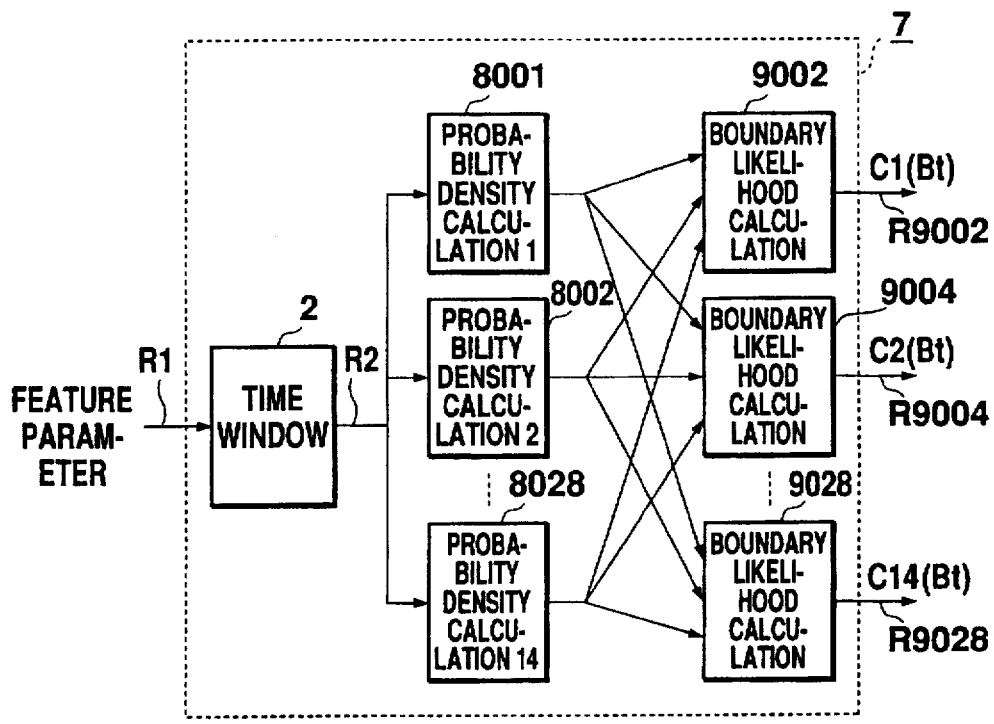
FIG. 9 is a structural view of the conventional boundary detecting means.
Figure 11:
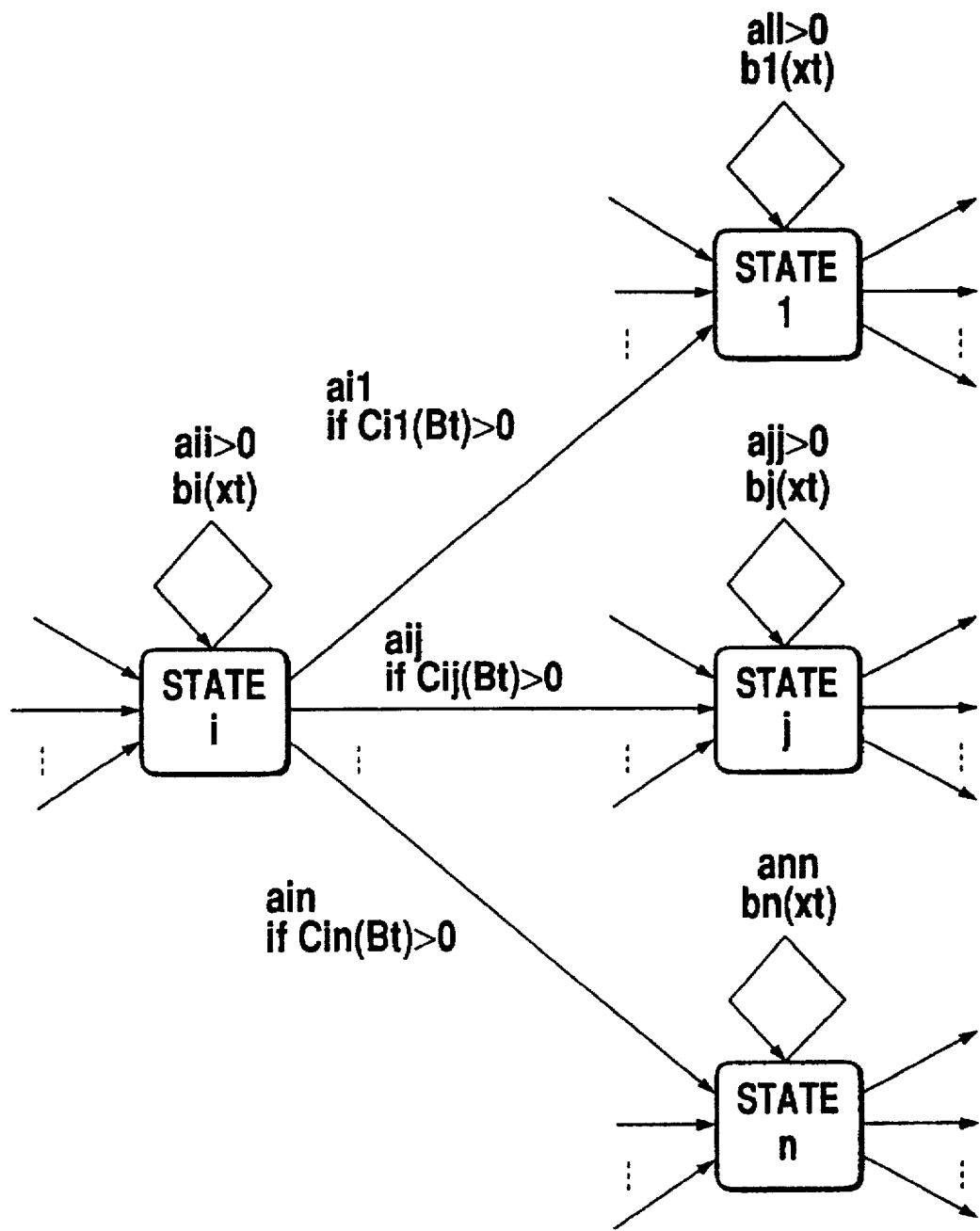
FIG. 11 is a structural view of HMM in the conventional voice recognition device.

FIG. 3 is a schematic structural view of a phonemic series HMM of the present embodiment. This HMM is formed of "n" states (=29), where each states is allowed to correspond to one phoneme. A probability of transition from state "i" to state "j" is expressed by aij, and a probability of output in state "j" of a feature parameter xt at the time "t" is expressed by bj(xt). The output probability bj(xt) is shown by a mixed Gaussian distribution of M (=8), and calculated by the equation (19) using, as a parameter, a mean vector μmj and a co-variance matrix Σmj, a branch probability λmj with respect to a m-th element Gaussian distribution, where in the equation, N (xt|μm j, Σmj) represents a normal probability density function of mean vector μmj and covariance Σmj. These transition probability aij and output probability calculating parameters are stored into the HMM parameter storage 14.

$$bj(xt) = \sum_{m=1}^{M} \lambda mj N(xt|\mu mj, \Sigma mj) \tag{19}$$

The HMM calculating section 13 refers to a boundary detecting result R7 of the boundary detection section 7 and a HMM parameter R14, and calculates, under an initial condition (equation (22)), recurrence formulas (the equations (20) and (21)) in accordance with Viterbi algorithm, where α(j,t) represents a probability (a forward probability) of remaining in a state "j" at the time "t", and β(j,t) represents a back pointer expressing an optimum state number one before a state "j" at the time "t".

$$\alpha(j,t) = \max\{\alpha(i,t-1)aij\, bj(xt)\}\ (t=1,2,\ldots,T)\ 1 \leq i \leq n,\ Cij(Bt) > \theta ij \text{ (when } i \neq j\text{)} \tag{20}$$

$$\beta(j,t) = \text{argmax}\{\alpha(i,t-1)aij\, bj(xt)\}\ (t=1,2,\ldots,T)\ 1 \leq i \leq n,\ Cij(Bt) > \theta ij \text{ (when } i \neq j\text{)} \tag{21}$$

$$\alpha(i,0) = 1\ (i=1,2,\ldots,n) \tag{22}$$

As shown in the recurrence formula in the above, upon a state transition in the time "t" from state "i" to state "j", the present HMM, which differs from the conventional HMM, is to refer a variable Cij(Bt), to compare with a threshold value θij having a dependency on the kinds =k(i,j) of the phonemic boundary, and to limit transition between the states as a production of a boundary of the phonemic model series in such a manner as allows transition between the states only when Cij (Bt)>θij is established. In this case, no limit is provided for transition (when i=j) within the same states by variable Cij(Bt).

The variable Cij(Bt) corresponds to the boundary likelihood degree Ck(Bt) of the classification "k" which is calculated by the boundary detection section 7. The classification "k" is given by function k(i, j) of the state numbers i and j. An optimum state series detection section 15 as a phonemic series converting means outputs an optimum state series R15 (hereinafter referred to as "β'(1), β'(2), ..., β'(T)") from values of the forward probability α(j, t) and back pointer β(j, t) which are obtained as an HMM calculation result R13. The optimum state series R15 can be obtained by calculating the recurrence formula (the equation (23)) under the initial condition (the equation (24)), where the optimum state series R15 is expressed by a series of state numbers in respect of the phonemic series of the recognized result.

$$\beta'(t-1) = \beta(\beta'(t),t)\ (t=T, T-1, \ldots, 1) \tag{23}$$

$$\beta'(T) = \text{argmax}\ \alpha(j,T) \tag{24}$$

$$1 \leq j \leq n$$

In the following, an evaluation result of the embodiment will be described.

In the embodiment with the construction above, a method of setting a threshold value (θij) of the boundary detection is studied by experimentation of phoneme description by unspecified speakers.

Therefore, a semicontinuous distribution model is also applied for an output probability of state, and two kinds of phoneme system are tried. Namely, one is a phoneme system formed of 29 phonemes independent of the environment of the phonemes in front and behind, and another is a phoneme system formed of 217 phonemes including a consonant and an allophone having a dependency on a succeeding phoneme in respect of a closed section. Assume the state transition probability aij as "1" or "0", then only phoneme alignment information is used. The condition of common experimentation is shown in FIG. 4. FIG. 5 shows the number of phonemes within the learning data of the phonemic system formed of 29 phonemes, and FIG. 6 shows the number of phonemes within the learning data of the phonemic system formed of 217 phonemes (showing only 170 phonemes that were actually observed).

For reference, HMM without being bound to the state transition is also evaluated. A result of the evaluation is shown in FIG. 7, where the phoneme error factor, in percent, is tabulated for an unspecified speaker. As can be seen in FIG. 7, the number of errors is reduced by suitably selecting the threshold value of the boundary detection.

As a result of analysis of recognition error, is found that two cases exist. Namely, although the boundary is detected correctly, a likelihood degree of the phoneme is lower produces substitution error, and when the boundary is detected incorrectly, this produces a fall-out error. In the former case, an improvement of accuracy is expected by giving the phonemic model a preciseness such as a state increase per phoneme or the like. In the latter case, although all the threshold values θij are varied as the same value in the embodiment, then, due to a difference of difficulty existing depending on the kinds of phonemic boundaries, an improvement of accuracy is expected by varying the threshold value θij for every kind of phonemic boundary, such as a smaller threshold value for the phonemic boundary with difficult detection, and a higher threshold value for the phonemic boundary with easy detection.

In the embodiment, the Viterbi algorithm is used for the HMM calculation. However according to the invention, it is of course possible, in the Viterbi algorithm, to apply for the HMM in accordance with a fixed formula such as the equation (25) where a maximized calculation max is replaced by a sum Σ (where the optimum state series must be detected in accordance with the Viterbi algorithm).

$$\alpha(j,t)=\Sigma\alpha(i, t-1)aij\ bj(xt) \quad (25)$$

$$1 \leq i \leq n$$

Further in the embodiment, 29 kinds of phoneme or 217 kinds of phoneme further divided from the 29 kinds thereof are allowed to correspond to each HMM as a phonemic model series. However according to the invention, the kinds or systems of the phonemes are not limited to such an embodiment. In addition, the number of states which are assigned to each phoneme is not limited to such embodiment. Moreover, according to the invention, the HMM is not always required for the phonemic model, and for example, the phonemic model with a linear type phoneme context dependency may preferably be utilized, which is introduced in "The Study of Phoneme Recognition Using A Time Dependency Linear Type Phoneme Context Model", March, 1990, Japanese Acoustic Society, Articles of the Meeting, 2-P-27.

In effect, as hereinbefore described, according to the method of estimating a boundary of voice recognition according to the invention, it is capable of designing with improved accuracy while being less affected from a lack of learning data, and is capable of designing the individual boundary detector corresponding to the phonemic boundary suitable for the voice boundary for every kind of voice boundary because there of the voice boundary detector corresponding to the boundary of the voice.

A voice recognition device according to the invention, includes a feature extracting means for analyzing an input voice and converting it into a feature parameter of time series; a boundary detecting means for detecting a region of a phonemic boundary or a neighborhood of the phonemic boundary in the input voice from the feature parameter of the time series; a model calculating means in which a time of producing each boundary of a plurality of phonemic model series is limited within a region of the phonemic boundary or the neighborhood of the phonemic boundary which the boundary detecting means detects when preparing the model series, the phonemic model series being prepared corresponding to the feature parameter; and a phonemic series converting means for selecting a suitable phonemic model series corresponding to the input voice from a result of the model calculating means, wherein a voice recognition device is such, the boundary detecting means is made a detecting means for detecting a phonemic boundary by comparing with a threshold value having a dependency on a kind of phonemic boundary.

What is claimed is:

1. A computer-implemented process for estimating a presence of a phonemic boundary within a parametric voice signal, comprising the steps of:

analyzing an input voice to obtain the parametric voice signal;

extracting as a sample each value of the parametric voice signal within a variable position window of a predetermined time width;

calculating for the sample extracted at each position of the window a common probability density which represents a probability that the phonemic boundary lies at a center of the window;

calculating a first probability density estimating whether a particular boundary type lies at the center of the window, by multiplying the common probability density calculated by a first polynomial coefficient;

calculating a second probability density estimating whether the particular boundary type does not lie at the center of the window, by multiplying the common probability density calculated by a second polynomial coefficient; and producing a signal indicative of the estimate of the presence of the phonemic boundary as a function of the first and second probability densities.

2. A voice recognition device including a feature extracting means for analyzing an input voice and converting into a feature parameter of time series;

a boundary detecting means for detecting a region of a phonemic boundary or a neighborhood of the phonemic boundary in the input voice from the feature parameter of time series, the boundary detecting means first comparing a probability that the phonemic boundary or the neighborhood of the phonemic boundary exists within a window having a predetermined time width to a probability that the phonemic boundary or the neighborhood of the phonemic boundary does not exist within the window and comparing a result of the first comparison to a threshold having a value that varies dependent on a particular type of phonemic boundary that is detected;

a model calculating means in which a time of producing each boundary of a plurality of phonemic model series is limited within a region of the phonemic boundary or the neighborhood of the phonemic boundary which the boundary detecting means detects when preparing the model series, the phonemic model series being prepared corresponding to the feature parameter; and a phonemic series converting means for selecting a suitable phonemic model series corresponding to the input voice from a result of the model calculating means.

3. A computer implemented process as recited in claim 1, the step of analyzing further comprising:

detecting when an input voice signal lies within a voice zone based upon a power calculation.

4. A computer implemented process as recited in claim 3, further comprising the steps of:

performing a hidden Markov model calculation based on the estimate of the presence of a phonemic boundary, the parametric voice signal sample and a hidden Markov model parameter.

5. A computer implemented process as recited in claim 4, further comprising the step of:

computing an optimum state series based upon the hidden Markov model computation.

6. A computer implemented process as recited in claim 5, wherein the step of computing an optimum state series further comprises the steps of:

establishing a boundary likelihood classification relative to a state transition in the hidden Markov model;

comparing the boundary likelihood classification to a variable threshold related to the state transition;

changing state in the hidden Markov model in accordance with the state transition when the boundary likelihood classification exceeds the variable threshold; and varying the variable threshold to have high values corresponding to easy to detect phonemic boundaries and low values corresponding to difficult to detect phonemic boundaries.

7. A method of producing a signal representing an estimate of the presence at a time location in a voice signal of a phonemic boundary comprising the steps of:

receiving the voice signal into an analysis system;

analyzing the voice signal to produce a parametric voice signal representing the voice signal as a time series of parameter groups;

extracting as a sample each parameter group within a variable position window of a predetermined time width;

calculating for the sample extracted at each position of the window a common probability density which represents a probability that the phonemic boundary lies at a center of the window;

calculating a first probability density estimating whether a particular boundary type lies at the center of the window, by multiplying the common probability density calculated by a first polynomial coefficient;

calculating a second probability density estimating whether the particular boundary type does not lie at the center of the window, by multiplying the common probability density calculated by a second polynomial coefficient; and producing a signal indicative of the estimate of the presence of the phonemic boundary as a function of the first and second probability densities.

8. A method of producing as recited in claim 7, the step of analyzing further comprising:

detecting when an input voice signal lies within a voice zone based upon a power calculation.

9. A method of producing as recited in claim 8, farther comprising the steps of:

performing a hidden Markov model calculation based on the estimate of the presence of a phonemic boundary, the parametric voice signal sample and a hidden Markov model parameter.

10. A method of producing as recited in claim 9, further comprising the step of:

computing an optimum state series based upon the hidden Markov model computation.

11. A method of producing as recited in claim 10, wherein the step of computing an optimum state series further comprises the steps of:

establishing a boundary likelihood classification relative to a state transition in the hidden Markov model;

comparing the boundary likelihood classification to a variable threshold related to the state transition;

changing state in the hidden Markov model in accordance with the state transition when the boundary likelihood classification exceeds the variable threshold; and varying the variable threshold to have high values corresponding to easy to detect phonemic boundaries and low values corresponding to difficult to detect phonemic boundaries.

12. A method of producing a signal representing an estimate of the presence at a time location in a voice signal of a phonemic boundary comprising the steps of:

receiving the voice signal into an analysis system;

analyzing the voice signal to produce a parametric voice signal representing the voice signal as a time series of parameter groups;

extracting as a sample each parameter group within a window of a predetermined time width, the window centered at a time location;

calculating from the time series of parameter groups a probability that a phonemic boundary lies at the time location;

multiplying the probability calculated by a first polynomial coefficient to form a probability that a particular type of phonemic boundary lies at the time location;

multiplying the probability calculated by a second polynomial coefficient to form a probability that the particular type of phonemic boundary does not lie at the time location; and producing a signal indicative of the estimate of the presence of the phonemic boundary as a function of the first and second probability densities.

13. A method of producing a signal as recited in claim 12, the step of analyzing further comprising:

detecting when an input voice signal lies within a voice zone based upon a power calculation.

14. A method of producing a signal as recited in claim 13, further comprising the steps of:

performing a hidden Markov model calculation based on the estimate of the presence of a phonemic boundary, the parametric voice signal sample and a hidden Markov model parameter.

15. A method of producing a signal as recited in claim 14, further comprising the step of:

computing an optimum state series based upon the hidden Markov model computation.

16. A method of producing a signal as recited in claim 15, wherein the step of computing an optimum state series further comprises the steps of:

establishing a boundary likelihood classification relative to a state transition in the hidden Markov model;

comparing the boundary likelihood classification to a variable threshold related to the state transition;

changing state in the hidden Markov model in accordance with the state transition when the boundary likelihood classification exceeds the variable threshold; and varying the variable threshold to have high values corresponding to easy to detect phonemic boundaries and low values corresponding to difficult to detect phonemic boundaries.

17. Apparatus for estimating a likelihood of presence of a phonemic boundary at a time location within a voice signal, comprising:

a voice signal analyzing device having an input receiving the voice signal, having an output carrying a parametric voice signal, the voice analyzing device producing the parametric voice signal as a time series of parameter groups;

a segment extraction device connected to receive from the voice signal analyzing device the parametric voice signal, and producing at an output a signal representing a segment of the voice signal including a time series of parameter groups falling within a variable position window of a predetermined time width, the window having a center at a time location;

a first probability calculating device, receiving the segment of the voice signal from the segment extraction device and producing an output signal representing a probability that the phonemic boundary lies at the time location;

a second probability calculating device, receiving the probability from the first probability calculating device, and multiplying the probability received by a first polynomial coefficient to produce a signal indicative of likelihood of presence of a particular type of phonemic boundary at the time location;

a third probability calculating device, receiving the probability from the first probability calculating device, and received by a second polynomial coefficient to produce a signal indicative of likelihood that a particular type of phonemic boundary does not lie at the time location.

18. Apparatus as recited in claim 17, the voice signal analyzing device further comprising:

a comparator receiving the input voice signal and determining when the input voice signal lies within a voice zone based upon a power calculation.

19. Apparatus as recited in claim 18, further comprising:

a device having inputs receiving the estimate of the presence of a phonemic boundary, the parametric voice signal sample and a hidden Markov model parameter and producing an output representing a hidden Markov model.

20. Apparatus as recited in claim 19, further comprising:

a state machine receiving as an input the hidden Markov model computation and producing as an output an optimum state series.

21. Apparatus as recited in claim 20, wherein the state machine further comprises:

means for establishing a boundary likelihood classification relative to a state transition in the hidden Markov model;

means for comparing the boundary likelihood classification to a variable threshold related to the state transition;

means for changing state in the hidden Markov model in accordance with the state transition when the boundary likelihood classification exceeds the variable threshold; and means for varying the variable threshold to have high values corresponding to easy to detect phonemic boundaries and low values corresponding to difficult to detect phonemic boundaries.

22. The voice recognition device of claim 2, wherein the value of the threshold increases when the particular type of phonemic boundary is easy to detect and wherein the value of the threshold decreases when the particular type of phonemic boundary is difficult to detect.

23. The voice recognition device of claim 2, wherein the boundary detecting means includes:

common probability calculating means for calculating a common probability density that the phonemic boundary or the neighborhood of the phonemic boundary exists within the window independently of the particular type of phonemic boundary;

first means for multiplying the common probability density by a first polynomial coefficient to estimate the probability that the phonemic boundary or the neighborhood of the phonemic boundary exists within the window; and second means for multiplying the common probability density by a second polynomial coefficient to estimate the probability that the phonemic boundary or the neighborhood of the phonemic boundary does not exist within the window.

* * * * *